Figure 1:
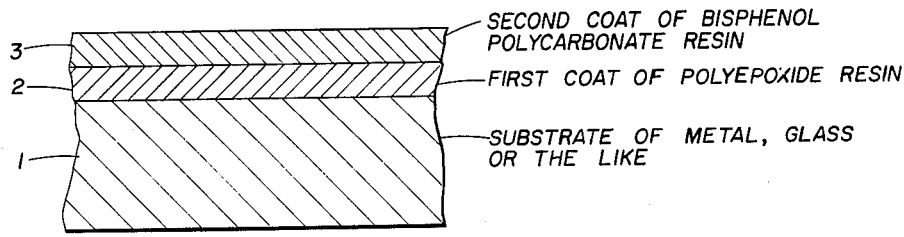

June 28, 1966  J. R. CALDWELL ET AL  3,258,356
POLYCARBONATE COATINGS
Filed Feb. 23, 1962

JOHN R. CALDWELL
WINSTON J. JACKSON, JR.
INVENTORS

BY R. Frank Smith
Charles L. Good
ATTORNEYS

United States Patent Office 3,258,356
Patented June 28, 1966

---

3,258,356
POLYCARBONATE COATINGS
John R. Caldwell and Winston J. Jackson, Jr., Kingsport, Tenn., assignors to Eastman Kodak Company, Rochester, N.Y., a corporation of New Jersey
Filed Feb. 23, 1962, Ser. No. 175,290
6 Claims. (Cl. 117—72)

This invention relates to improvements in coating materials and in laminated coatings. More particularly, the invention relates to coatings and coating materials comprising polyepoxide resins and bisphenol polycarbonates.

An object of this invention is to provide new coating compositions and laminated coatings for surfaces of metal, glass and the like, which can withstand high temperatures and which provide a tightly bonded coating on such surfaces.

According to the invention, coatings are provided comprising polyepoxide resins cured with a suitable crosslinking agent commonly called a curing catalyst, and polycarbonates of bisphenols. Included in the invention are laminated coatings comprising a layer of polyepoxide resin applied to and cured on a substrate of metal, glass or the like, and a layer of a bisphenol polycarbonate applied over the polyepoxide layer. Also included are coating compositions containing a mixture of polyepoxide and bisphenol polycarbonate resins and coatings formed by such compositions.

The use of polyepoxide resins in various coating materials is well known and it is known to form insoluble cross-linked polyepoxide resin coatings by incorporating a "curing catalyst" such as triethylenediamine in a polyepoxide coating material, then applying the material as a coat and curing at temperatures around 100–150° C. to cause a cross-linking reaction. The cured coatings possess excellent adhesion at temperatures up to about 200° C., but at about 200–250° C. they become soft and lose adhesive strength. However, when used in combination with a polycarbonate resin, either in a laminated coating or in a mixed coating composition, the cured polyepoxide resins maintain excellent adhesive strength at temperatures up to near the second order transition temperature of the polycarbonate resin, which may be well above 250° C. for certain bisphenol polycarbonates.

When used alone as coatings on surfaces of metal, glass and the like, the bisphenol polycarbonates do not possess as good adhesive qualities as they do when used in accordance with this invention in laminated coatings or in mixed compositions with the polyepoxides. The adhesive qualities of the polycarbonates are greatly improved in the coatings of the invention.

When polyepoxide and polycarbonate resins are used in combinations according to the invention, the adhesive qualities of the polycarbonate are improved and the epoxide resins retain adhesive strength at temperatures higher than when used alone.

Figure 2:
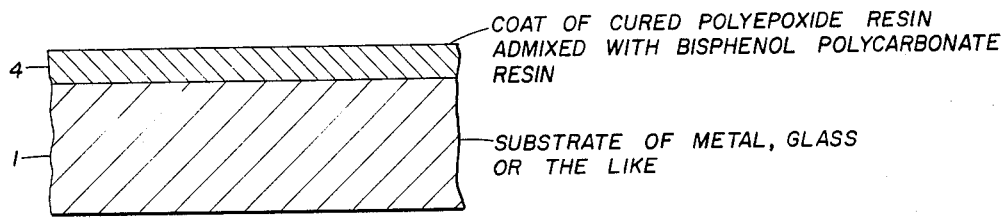

Reference is made to the drawing in which the FIGURES 1 and 2 illustrate two embodiments of this invention.

FIGURE 1 shows a composite article comprising a substrate 1, a first coat 2 on said substrate which is essentially composed of a polyepoxide resin cured on the surface of said substrate, and a second coat 3 consisting essentially of a bisphenol polycarbonate resin.

FIGURE 2 shows a composite article comprising a coat 4 which is adhesively in contact with a substrate 1, said coat 4 being essentially composed of a cured polyepoxide resin in admixture with a bisphenol polycarbonate resin, said polyepoxide resin having been cured after coating said substrate with said admixture in its uncured form.

Following are examples illustrating some preferred embodiments of the invention.

Example 1

Five grams of Epon 1004 were dissolved in 30 ml. of methylene chloride solvent and 0.1 gram of triethylenediamine was added as a curing agent. This solution was then coated and dried on the surfaces of plates of steel, aluminum, tin, copper and glass. After the solvent had evaporated leaving thin films on the surfaces, they were cured for one hour in an oven at 110° C. Then coatings of a polycarbonate of 4,4'-(hexahydro-4,7-methanoindan-5-ylidene)diphenol were cast from a toluene solution as a second layer over the cured polyepoxide films, and also some were cast dirtctly upon the surfaces of other plates of the same materials. When the plates on which only the cured polyepoxide coating had been applied were heated to 250° C., the cured coating softened and could be scraped from the surfaces easily. The polycarbonate films that had been applied directly to the metal or glass would crack and peel off when the metal plates were bent double. But the two-layer laminated coatings remained tightly bonded when the metal plates were bent double, and when these plates were heated to 250°–300° C. for a seven hour period the laminated coatings did not soften but remained tightly bonded to the various substrates. The experiment was repeated using copper wire as the metal substrate and the same results were observed.

Example 2

The procedure of Example 1 was repeated using Epon 834 with triethylenediamine curing catalyst in the polyepoxide coating layer and using a polycarbonate resin prepared from 4,4'-(hexahydro-4,7-methanoindan-5-ylidene)diphenol, phosgene, and the bischloroformate of a short-chain, hydroxy-terminated polyester of cyclohexanedimethanol and maleic anhydride. This polycarbonate contains reactive double bonds which will crosslink when the resin is cured at temperatures above about 100° C. in the presence of a curing agent and is described in our copending application Serial No. 137,976 titled, "Thermosetting Polyesters," filed September 14, 1961. Other suitable resins for use in accordance with this embodiment of the invention are also described in the same application. The polycarbonate film was cast from a methylene chloride solution containing 0.3% by weight, based on the polymer, of cobalt naphthenate as a curing agent. After the solvent had evaporated, the polycarbonate film layer was cured by heating at 140° C. for 2 hrs. to form a cross-linked polycarbonate film. Laminated coatings of cured polyepoxide and cured polycarbonate films adhered tightly and resisted abrasion at 250° C., at which temperature the cured polyepoxide film alone had softened and could be easily scraped off.

Example 3

The procedure of Example 1 was repeated using a bisphenol A (4,4'-isopropylidene diphenol) polycarbonate as the polycarbonate layer. The laminated coatings did not crack or peel when the plates were bent through 180 degrees as the polycarbonate coating alone did, but the laminated coating did soften when heated at about 200° C. This is attributable to the lower second order transition temperature of bisphenol A polycarbonate resin.

Example 4

A mixed solution was prepared containing 1 gram of Epon 1004, 0.05 gram of triethylenediamine catalyst, and 4 grams of 4,4'-(hexahydro-4,7-methanoindan-5-ylidene) diphenol polycarbonate dissolved in methylene chloride. Coatings of this mixture were cast on plates as in Example 1 and cured at 110° C. for one hour These coatings retained their hardness and had excellent adhesion at 250° C. When the coated metal plates were bent through 180 degrees, the coating remained tightly bonded to the metal.

Our experiments show that laminated coatings like those described in Examples 1 and 2 and mixed coatings like that described in Example 4 will remain hard and well bonded at temperatures up to near the second order transition temperature of the bisphenol polycarbonate component, even though the epoxide component alone would soften at a much lower temperature. A number of bisphenol polycarbonate compositions having unusually high second order transition temperatures and suitable for use in accordance with this invention are described in our copending application Serial No. 137,980 titled "Bisphenol Polycarbonates," filed September 14, 1961, now abandoned. When the polycarbonate has a lower second order transition temperature as did the bisphenol A of Example 3, the softening temperature will be lower for the laminated coating. Nevertheless, the bonding of the polycarbonate film is improved when used in combination with such polyepoxide resins.

The term "polyepoxide resin" as used in this specification is defined as a polymer having the general formula:

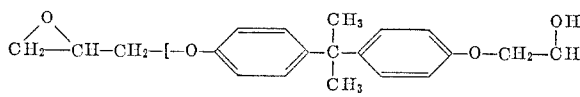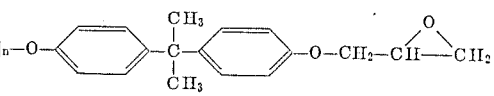

and having an epoxide equivalent between 175 and 4000, where the epoxide equivalent is defined as the number of grams of resin containing one gram equivalent of epoxide. The Epon resins used in the examples above were obtained from the Shell Chemical Corp.

The term "bisphenol polycarbonate" as used in this specification is a generic term that includes linear polymeric resins obtained by condensing at least one bisphenol with at least one diacid chloride such as phosgene and various diol bis-chloroformates of saturated or unsaturated diols, and the term also includes resins obtained by cross-linking such linear polymers.

We believe that a chemical reaction occurs between some of the polyepoxide and polycarbonate molecules. It is known that hydroxyl groups such as those present on the polyepoxide chain will react with phenyl carbonate esters to cleave the ester link and form the aliphatic carbonate by displacing phenol. Such a reaction between a bisphenol polycarbonate and a polyepoxide would result in attachment of polycarbonate chains to the polyepoxide to form a mixed aliphatic-aromatic carbonate and a phenol.

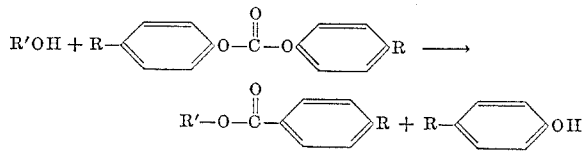

R' is the polyepoxide chain.
R is the polycarbonate chain.

While we do not wish to be limited by offering a theoretical explanation, we believe this reaction would account for the good adhesion of the coatings of this invention.

The invention has been described by reference to certain preferred embodiments, it being understood that modifications and variations may be made within the scope of the invention described above and defined in the following claims.

We claim:

1. A coated article having a smooth surface, adhesively in contact with a coating essentially composed of a first coat of polyepoxide resin coated and cured on a surface to be covered and a second coat of a polycarbonate resin, that can be cured by cross-linking, coated and cured over said first coat.

2. A composite article comprising a substrate, a first coat on said substrate which is essentially composed of a polyepoxide resin cured on the surface of said substrate, and a second coat consisting essentially of a bisphenol polycarbonate resin which has a second order transition temperature at least as high as the second order transition temperature of that resin in which the bisphenol is 4,4'-isopropylidene diphenol.

3. An article as defined by claim 2 wherein the bisphenol of said polycarbonate resin is 4,4'-isopropylidene diphenol.

4. An article as defined by claim 2 wherein said second order transition temperature is above 250° C.

5. An article as defined by claim 4 wherein the bisphenol of said polycarbonate resin is 4,4'-(hexahydro-4,7-methanoindan-5-ylidene) diphenol.

6. An article as defined by claim 5 wherein said polycarbonate is a copolymer with a short-chain, hydroxy-terminated polyester of cyclohexanedimethanol and maleic anhydride.

References Cited by the Examiner
UNITED STATES PATENTS

| | | | |
|---|---|---|---|
| 2,592,560 | 4/1952 | Greenlee | 260—47 |
| 2,795,572 | 6/1957 | Mueller et al. | 260—77 |
| 3,008,848 | 11/1961 | Annonio | 117—161 |
| 3,022,171 | 2/1962 | Ossenbrunner et al. | 260—47 X |
| 3,030,335 | 4/1962 | Goldberg | 260—47 X |
| 3,098,056 | 7/1963 | Schnell et al. | 260—835 |

WILLIAM D. MARTIN, *Primary Examiner.*

RICHARD D. NEVIUS, *Examiner.*

K. G. WHEELESS, H. W. MYLIUS, *Assistant Examiners.*